(12) United States Patent
Lee et al.

(10) Patent No.: US 11,992,121 B2
(45) Date of Patent: May 28, 2024

(54) FIXING ASSEMBLY

(71) Applicant: SEGOS CO., LTD., Incheon (KR)

(72) Inventors: Doo Myun Lee, Incheon (KR); Sang Eun Park, Incheon (KR)

(73) Assignee: SEGOS CO., LTD., Incheon (KR)

( * ) Notice: Subject to any disclaimer, the term of this patent is extended or adjusted under 35 U.S.C. 154(b) by 346 days.

(21) Appl. No.: 17/433,636

(22) PCT Filed: Feb. 26, 2020

(86) PCT No.: PCT/KR2020/002743
§ 371 (c)(1),
(2) Date: Aug. 25, 2021

(87) PCT Pub. No.: WO2020/180041
PCT Pub. Date: Sep. 10, 2020

(65) Prior Publication Data
US 2022/0160128 A1  May 26, 2022

(30) Foreign Application Priority Data

Mar. 4, 2019 (KR) .................. 10-2019-0024776
Jun. 12, 2019 (KR) .................. 10-2019-0069145

(51) Int. Cl.
*A47B 88/423* (2017.01)
*F16B 2/20* (2006.01)

(52) U.S. Cl.
CPC .............. *A47B 88/423* (2017.01); *F16B 2/20* (2013.01)

(58) Field of Classification Search
CPC .......... A47B 88/423; A47B 88/43; F16B 2/20
See application file for complete search history.

(56) References Cited

U.S. PATENT DOCUMENTS

| 2001/0044992 | A1* | 11/2001 | Jahrling | A47B 88/43 24/563 |
| 2012/0061534 | A1* | 3/2012 | Rehage | A47B 88/43 248/214 |
| 2012/0063708 | A1* | 3/2012 | Meier | F24C 15/168 384/22 |

FOREIGN PATENT DOCUMENTS

| DE | 102010021283 A1 * | 11/2011 | ............... F16B 1/02 |
| EP | 2818077 A1 | 12/2014 | |
| KR | 10-2011-0090729 A | 8/2011 | |
| KR | 10-2011-0133596 A | 12/2011 | |
| KR | 10-2014-0002465 A | 1/2014 | |
| KR | 2016-0065725 A | 6/2016 | |
| KR | 20180126898 A | 11/2018 | |
| WO | 2011/096666 A2 | 8/2011 | |
| WO | 2016/045951 A1 | 3/2016 | |

* cited by examiner

Primary Examiner — Matthew W Ing
(74) Attorney, Agent, or Firm — NKL LAW; Jae Youn Kim

(57) ABSTRACT

An embodiment of the present invention provides a fixing assembly comprising: a wire rack having a vertical frame and a horizontal frame; a slide rail which has a fixed rail coupled to the wire rack and a movable rail slidably disposed on the fixed rail; and a fixing means for fastening the fixed rail to the wire rack, wherein the fixing means comprises a first fixing clip provided on one side of the fixed rail and a second fixing clip provided on the other side of the fixed rail. The fixing assembly has a structure in which the first fixing clip is fixed laterally to the horizontal frame, and then the second fixing clip is fixed vertically to the horizontal frame.

11 Claims, 7 Drawing Sheets

FIXING ASSEMBLY

TECHNICAL FIELD

The present invention relates to a fixing assembly, and more specifically, to a fixing assembly in which a slide rail is firmly and rapidly installed on a wire rack by a simple operation using a fixing unit of a two-piece type coupled to the slide rail.

BACKGROUND ART

Generally, drawer assemblies, which are slidably coupled, are installed in installation structures such as dishwashers, ovens, and the like to receive or withdraw objects.

A slide rail is installed in the drawer assembly so that the drawer assembly operates smoothly when being withdrawn from and inserted into the installation structure. A rolling unit having a ball or roller type is installed in the slide rail so that the drawer assembly may move smoothly when sliding so that convenience of a user can be improved.

In addition, such a slide rail is fixed to the installation structure by a fixing unit, and since a fixing force of the fixing unit decreases due to continuous movement of the slide rail, deformation and separation problems occur frequently. Accordingly, a fixing unit having a complex structure or a structure using a high elastic force has appeared as a method of maintaining a high coupling force of the fixing unit, but there are problems in that a high force was required when coupling, and a cost is increased.

Accordingly, the need for an easy clip which allows a user to easily separate and couple a rail from and to a wire rack of the installation structure so as to improve convenience of the slide rail is increasing.

In addition, such an easy clip needs to be formed to have a structure which is simple, of which assembly convenience is high, and which is easily installed on the wire rack using a relatively small force.

RELATE ART

Korean Patent Publication No. 2016-0065725 (Jun. 9, 2016)

Technical Problem

The present invention is directed to providing a fixing assembly in which a slide rail is firmly and rapidly installed on a wire rack by a simple operation using a fixing unit having a two-piece type coupled to the slide rail.

Technical Solution

One aspect of the present invention provides a fixing assembly including a wire rack including a vertical frame and a horizontal frame, a slide rail including a fixed rail coupled to the wire rack and a movable rail disposed on the fixed rail to move in a sliding manner, and a fixing unit which fixes the fixed rail to the wire rack, wherein the fixing unit includes a first fixing clip provided at one side of the fixed rail and a second fixing clip provided at the other side of the fixed rail and has a structure in which the first fixing clip is laterally fixed to the horizontal frame and then the second fixing clip is vertically fixed to the horizontal frame.

According to one embodiment of the present invention, the first fixing clip may include a plate part which is in contact with and coupled to one surface of the fixed rail, a lateral fixing part formed on the plate part and including a first coupling part and a second coupling part coupled to angular end portions of the horizontal frame, and a horizontal fixing part formed on the plate part and including a first bent part and a second bent part which are supported by a horizontal part of the horizontal frame.

The plate part may include an auxiliary plate part formed to be supported by the horizontal part of the horizontal frame at a lower end portion of the plate part.

The lateral fixing part may include an auxiliary support part formed to be supported by the vertical frame at an end portion of the lateral fixing part.

The first coupling part and the second coupling part may be insertion-coupled through a space between an upper angular end portion and a lower angular end portion.

The first coupling part may include a first inclined part formed to be inclined upward and fixedly supported by the angular end portion and a second inclined part which is formed to be inclined downward and guides coupling toward the angular end portion, and a boundary part may be formed between the first inclined part and the second inclined part.

When a distance L1 is referred to as a distance between the boundary part of the first coupling part and a lower end portion of the second coupling part and a distance L2 is referred to as a shortest distance between an upper angular end portion and a lower angular end portion, the distance L1 may be formed to be greater than the distance L2.

The second fixing clip may include a first flat part which is in contact with and coupled to one surface of the fixed rail, a second flat part formed to face the first flat part, and a connection part which connects the first flat part and the second flat part and partially covers the horizontal frame.

At least one of the first flat part and the second flat part may include a convex part which is convexly formed inward, induces hooking when coupled to the horizontal frame, and prevents separation after the coupling.

The first flat part and the second flat part may include a first guide part and a second guide part which guide coupling when coupled to the horizontal frame.

When a distance D1 is referred to as a distance between the first flat part and a convex part formed in the second flat part or between the second flat part and a convex part formed in the first flat part and a distance D2 is referred to as a diameter of the horizontal frame, the distance D1 may be formed to be smaller than the distance D2.

When a distance H1 is referred to as a distance between a central axis of the convex part and the connection part and a distance H2 is referred to as a distance between an upper end of an upper horizontal part and a lower end of a lower horizontal part, the distance H1 may be formed to be greater than the distance H2.

The second fixing clip may further include a lateral support part supported by the vertical frame, and the lateral support part may include a third bent part formed to be bent outward from the second flat part and a fourth bent part which is formed to extend from the third bent part and is bent to be supported by the vertical frame.

Advantageous Effects

According to one aspect of the present invention, an assembly structure of a fixing assembly can be simplified by fixing a slide rail to a wire rack using a fixing unit of a two-piece type which is coupled to the slide rail and operates complementarily.

In addition, due to the simplified assembly structure of the fixing assembly, a user can rapidly and easily use the fixing assembly using a small force, and thus convenience of a user can be improved.

Effects of the present invention are not limited to above-described effects, and it should be understood that all effects which may be inferred from contents of the present invention described in the modes of the invention or claims are included thereto.

MODES OF THE INVENTION

Figure 1:
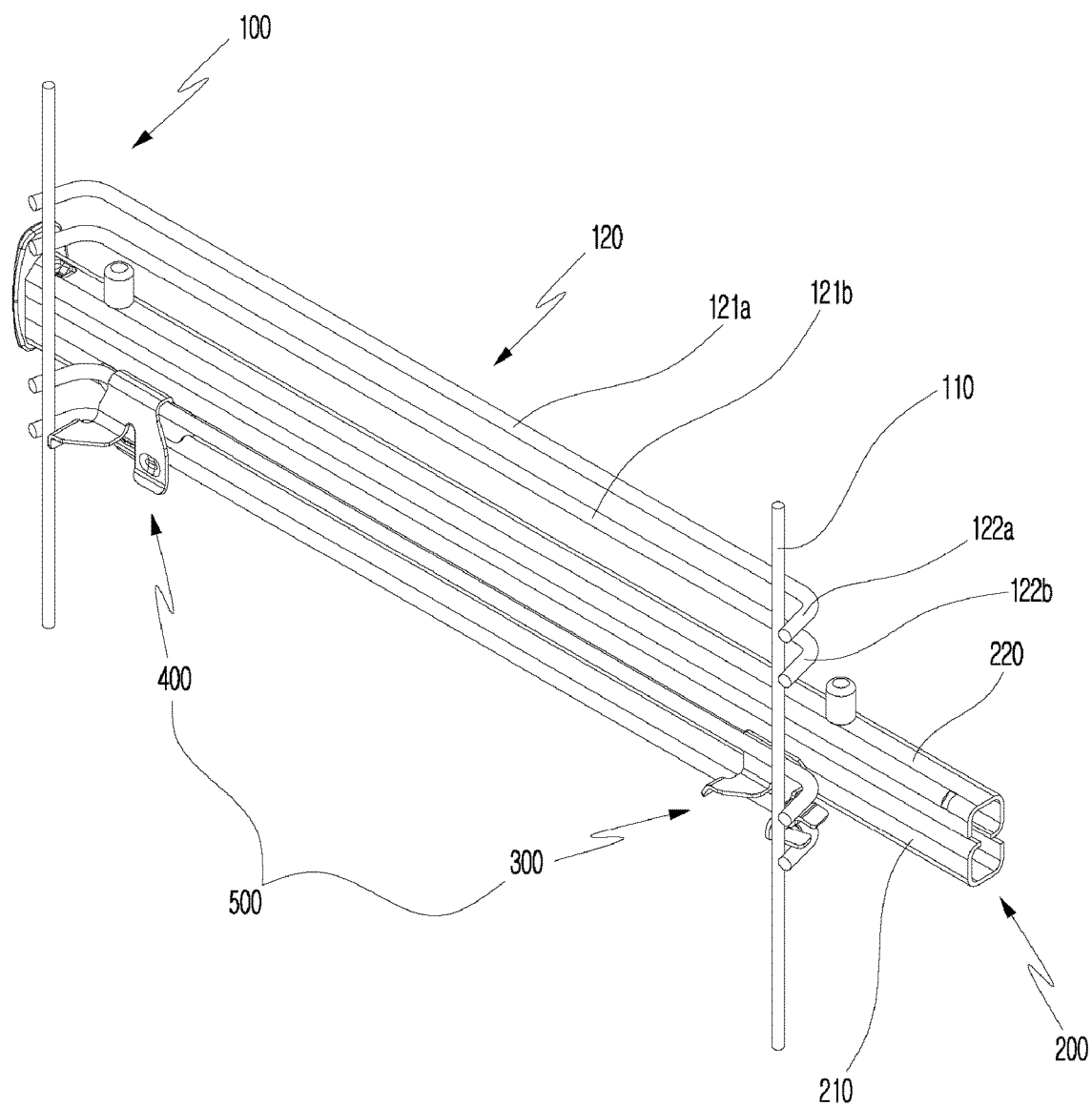
FIG. 1 is a perspective view illustrating a fixing assembly according to one embodiment of the present invention.

Hereinafter, the present invention will be described in detail with reference to the accompanying drawings. However, the present invention may be implemented in several different forms and are not limited to embodiments described herein. In addition, parts irrelevant to description are omitted in the drawings in order to clearly explain embodiments of the present invention. The same parts are denoted by the same reference numerals throughout this specification.

Throughout this specification, when a part is referred to as being "connected" to another part, it includes being "directly connected" and "indirectly connected" via an intervening part. Also, when a certain part "includes" a certain component, other components are not excluded unless explicitly described otherwise, and other components may in fact be included.

Hereinafter, exemplary embodiments of the present invention will be described in detail with reference to the accompanying drawings.

FIG. 1 is a perspective view illustrating a fixing assembly according to one embodiment of the present invention.

Referring to FIG. 1, a fixing assembly 1000 of the present invention includes a wire rack 100 formed to be supported by the ground surface, a slide rail 200 which is coupled to the wire rack 100 and disposed to be slidably movable, and a fixing unit 500 formed to fix the slide rail 200 to the wire rack 100.

The fixing assembly 1000 is coupled to an installation structure (not shown) such as a dishwasher, an oven, and the like and serves to receive and withdraw an object in a sliding manner.

According to one embodiment, the fixing assembly 1000 of the present invention includes the wire rack 100 supported by the ground surface.

More specifically, the wire rack 100 includes a pair of vertical frames 110 vertically disposed to be supported by the ground surface and one horizontal frame 120 horizontally disposed between and connected to the vertical frames 110. Accordingly, a weight applied from the horizontal frame 120 is supported by the vertical frames 110 in a direction perpendicular to the ground surface.

The horizontal frame 120 may be provided as one set including an upper horizontal frame 120, which has a horizontal part 121a and angular end portions 122a which are formed at both ends of the horizontal part 121a and have "L" shapes, and a lower horizontal frame 120 which has a horizontal part 121b and angular end portions 122b which are formed at both ends of the horizontal part 121b and have "L" shapes. In this case, as each of the angular end portions 122a and 122b is coupled to the vertical frame 110, the horizontal frame 120 may be fixed to the vertical frame 110 to be parallel to the ground surface.

Meanwhile, the slide rail 200 which is slidably movable may be coupled to the wire rack 100.

More specifically, the slide rail 200 includes a fixed rail 210 fixed to the horizontal frame 120 and at least one movable rail 220 provided to be slidably movable on the fixed rail 210. Accordingly, the slide rail 200 has a structure in which the at least one movable rail 220 slidably moves to one side or the other side to receive and withdraw an object according to user's needs.

Meanwhile, the fixed rail 210 may be coupled to the wire rack 100 by the fixing unit 500 including a first fixing clip 300 and a second fixing clip 400. The fixing unit 500 may be formed of a rigid material such as metal.

More specifically, the first fixing clip 300 and the second fixing clip 400 are coupled to one end portion and the other end portion of the fixed rail 210, and the first fixing clip 300 and the second fixing clip 400 are coupled to the wire rack 100 so that the fixed rail 210 may be fixed to the wire rack 100.

That is, the fixed rail 210 is coupled and fixed to the wire rack 100 by the first fixing clip 300 and the second fixing clip 400 which have different structures and operate complementarily to each other, and the movable rail 220 is formed to slidably move on the fixed rail 210.

Figure 2:
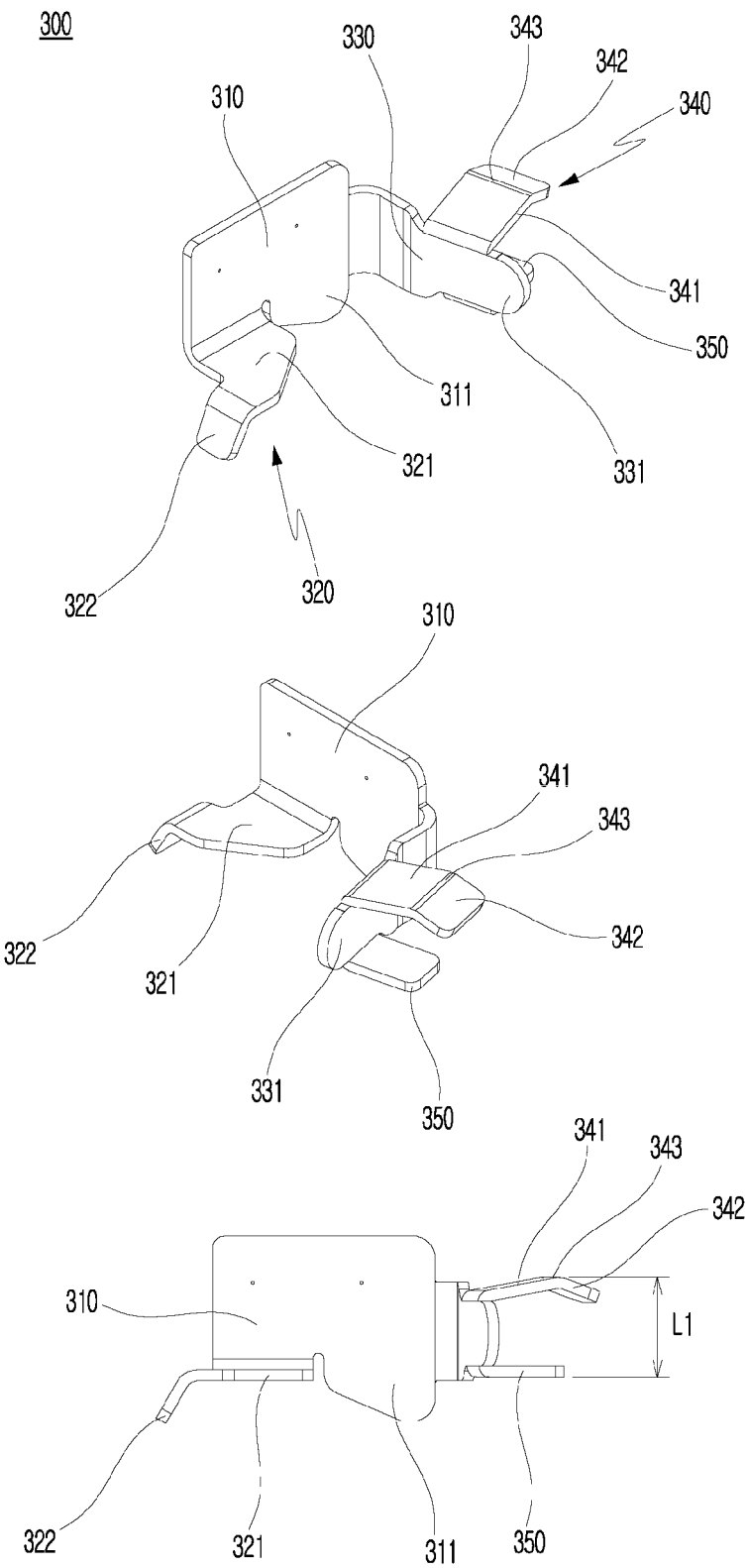
FIG. 2 shows a perspective view and a front view illustrating a first fixing clip according to one embodiment of the present invention.
Figure 3:
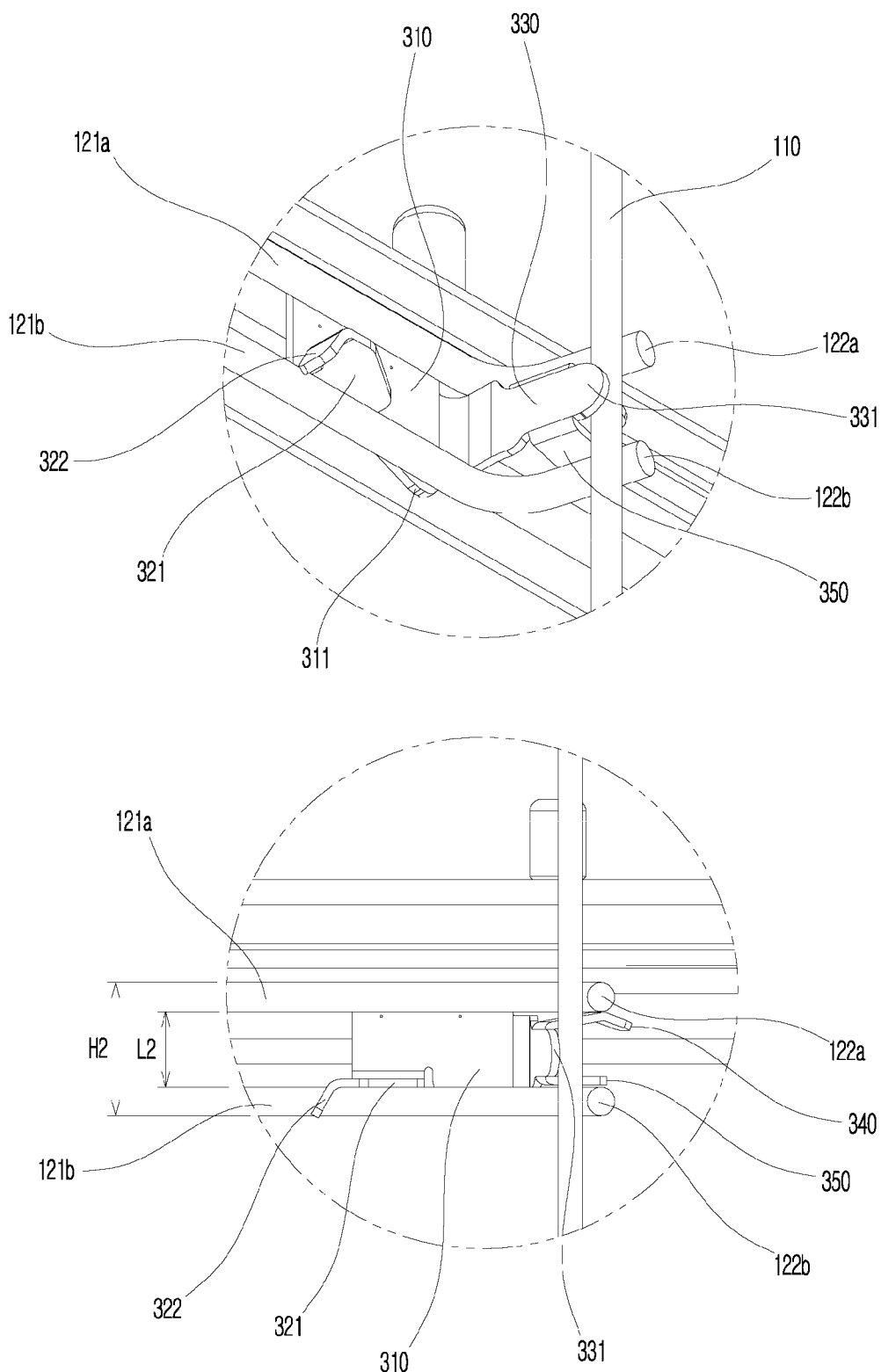
FIG. 3 is a view illustrating the first fixing clip coupled to a wire rack and a slide rail according to one embodiment of the present invention.

FIG. 2 shows a perspective view and a front view illustrating the first fixing clip according to one embodiment of the present invention, and FIG. 3 is a view illustrating the first fixing clip coupled to the wire rack and the slide rail according to one embodiment of the present invention.

Referring to FIGS. 2 and 3, the first fixing clip 300 includes a plate part 310, a horizontal fixing part 320, and a lateral fixing part 330.

More specifically, the plate part 310 is in contact with and welded to one surface of the fixed rail 210 or is coupled to the fixed rail 210 by a rivet, bolt, or the like. In addition, an auxiliary plate part 311 formed to be supported by one surface of the horizontal part 121b when coupled to the wire rack 100 may be provided at a lower side of the plate part 310.

The horizontal fixing part 320 includes a first bent part 321 formed at the lower side of the plate part 310 to be bent and a second bent part 322 which extends from the first bent part 321 and is formed to be bent and supported by the other surface of the horizontal part 121b.

That is, in a case in which the first fixing clip 300 is coupled to the wire rack 100, an upper horizontal part 121a of the horizontal frame 120 is horizontally supported by the plate part 310, one surface of a lower horizontal part 121b of the horizontal frame 120 is supported by the auxiliary plate part 311, and the other surface thereof is horizontally supported by the second bent part 322. Accordingly, horizontal movement of the first fixing clip 300 may be blocked.

The lateral fixing part 330 is formed to be bent from one side of the plate part 310, and an auxiliary support part 331 formed to be supported by the vertical frame 110 may be provided on an end portion of the lateral fixing part 330.

In addition, a first coupling part 340 and a second coupling part 350 coupled to the angular end portions 122a and 122b of the horizontal frame 120 may be formed on the lateral fixing part 330. More specifically, the first coupling part 340 may be formed at an upper side of the lateral fixing part 330 in a direction in which the first coupling part 340 is coupled to the angular end portions 122a and 122b, and the second coupling part 350 is formed at a lower side of the lateral fixing part 330 in a direction in which the second coupling part 350 is coupled to the angular end portions 122a and 122b.

That is, the first coupling part 340 and the second coupling part 350 are connected through the lateral fixing part 330 and may be formed in a "c" shape when viewed from the front.

The first coupling part 340 and the second coupling part 350 are inserted through a space between the upper angular end portion 122a and the lower angular end portion 122b. In this case, the first coupling part 340 may include a first inclined part 341 formed in a direction in which a distance between the first coupling part 340 and the second coupling part 350 increases and a second inclined part 342 formed in a direction in which the distance decreases, and a boundary part 343 may be formed between the first inclined part 341 and the second inclined part 342.

When the second inclined part 342 is coupled to the wire rack 100, the second inclined part 342 is in contact with a lower portion of the upper angular end portion 122a, serves to guide insertion, and is pressed by the upper angular end portion 122a in a downward direction. Accordingly, the first coupling part 340 is elastically deformed in the downward direction until the boundary part 343 is inserted into the upper angular end portion 122a. In this case, after the boundary part 343 is inserted into the upper angular end portion 122a, an elastic restoring force is applied to the first coupling part 340 in an upward direction, and the first coupling part 340 is fixed to the upper angular end portion 122a by the first inclined part 341. That is, after the first fixing clip 300 is coupled to the horizontal frame 120, the first inclined part 341 serves to block upward movement of the first fixing clip 300.

When the first coupling part 340 is inserted, the second coupling part 350 is in contact with and serves to support an upper portion of the lower angular end portion 122b, and after the first fixing clip 300 is coupled to the horizontal frame 120, the second coupling part 350 serves to block downward movement of the first fixing clip 300.

Further referring to FIGS. 2 and 3, when a distance L1 is referred to as a distance between the boundary part 343 of the first coupling part 340 and a lower end portion of the second coupling part 350 and a distance L2 is referred to as a shortest distance between the upper angular end portion 122a and the lower angular end portion 122b, the distance L1 may be formed to be greater than the distance L2.

Accordingly, when the first fixing clip 300 is coupled to the angular end portions 122a and 122b of the horizontal frame 120, the first fixing clip 300 may be inserted between the angular end portions 122a and 122b while a user feels that the second inclined part 342 of the first coupling part 340 is caught, and after the first fixing clip 300 is coupled thereto, the elastic restoring force is continuously applied to the first inclined part 341 of the first coupling part 340, and thus the first fixing clip 300 can be firmly fixed to the wire rack 100.

That is, since the second inclined part 342 is formed to be inclined upward to the boundary part 343, the second inclined part 342 serves as a catch jaw when coupled to the angular end portions 122a and 122b, and when a predetermined force is applied thereto, the upper angular end portion 122a pushes the second inclined part 342 out so that the first fixing clip 300 is coupled to the horizontal frame 120. In this case, the second coupling part 350 is supported by the lower angular end portion 122b.

In addition, excessive insertion of the first coupling part 340 and the second coupling part 350 may be prevented when the auxiliary support part 331 formed at the end portion of the lateral fixing part 330 is supported by the vertical frame 110.

Accordingly, a coupling feeling of the first fixing clip 300 and the wire rack 100 can be improved, and vertical movement of first fixing clip 300 can be blocked.

Figure 4:
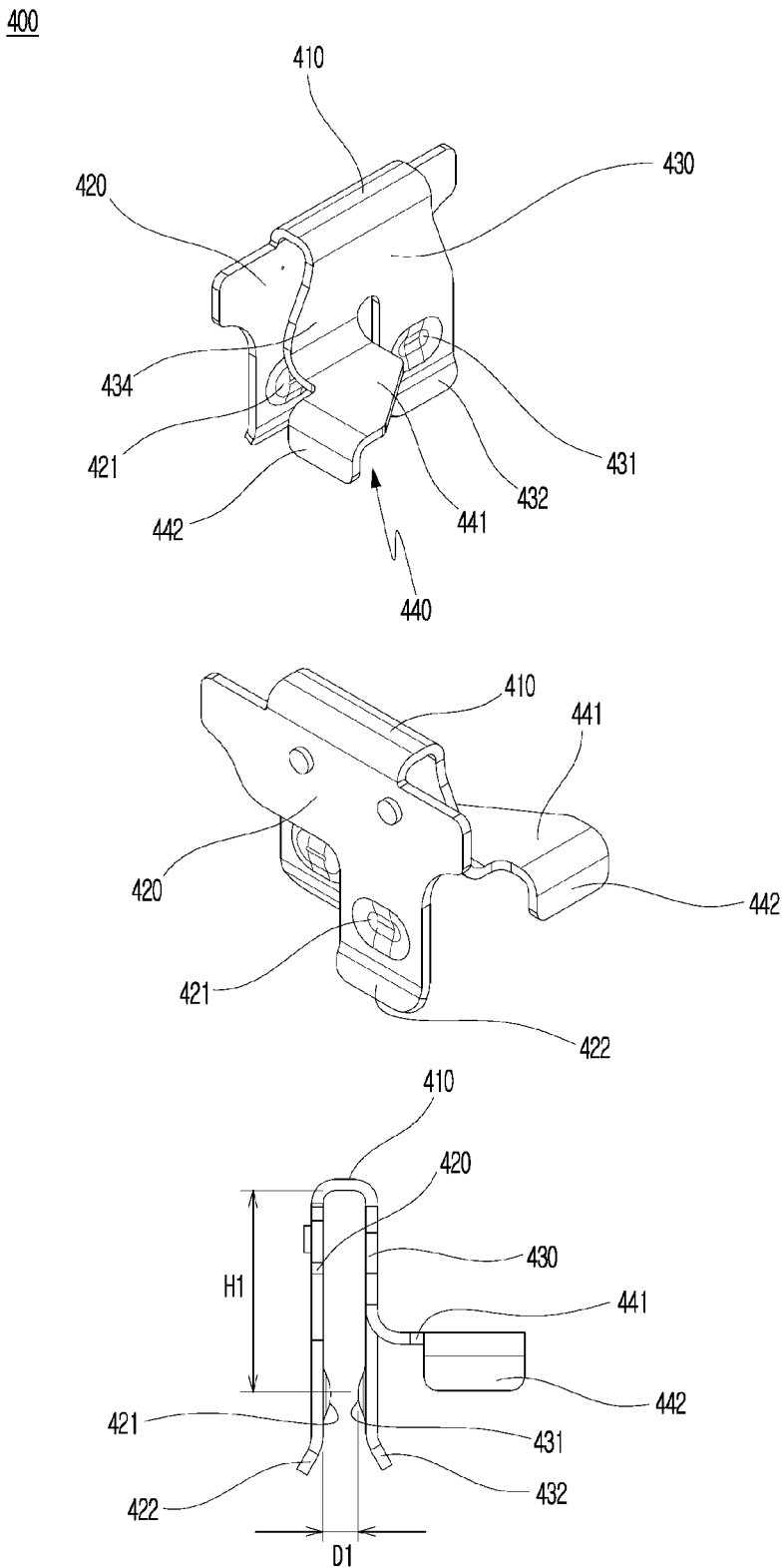
FIG. 4 shows a perspective view and a side view illustrating a second fixing clip according to one embodiment of the present invention.
Figure 5:
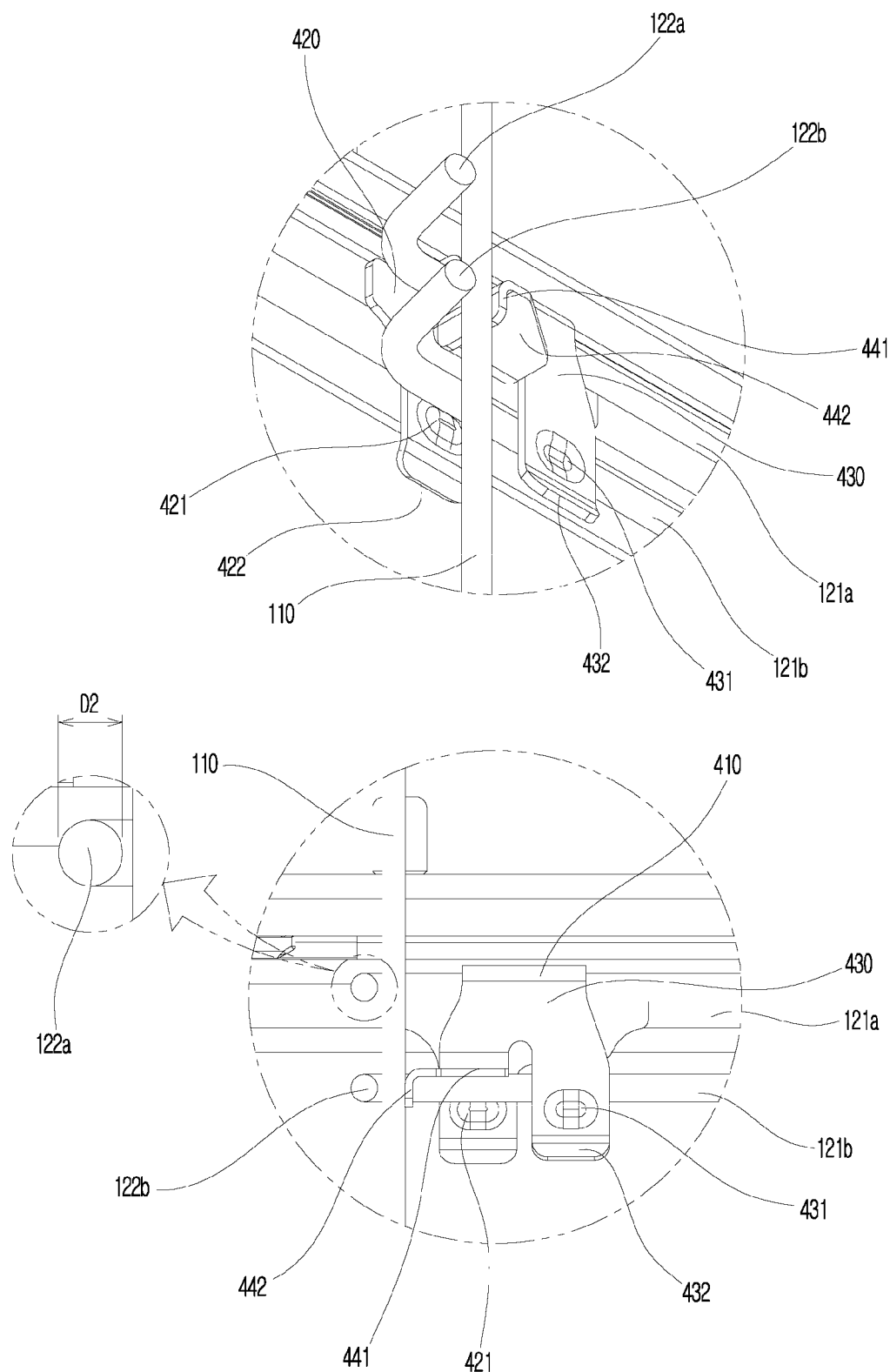
FIG. 5 is a view illustrating the second fixing clip coupled to the wire rack and the slide rail according to one embodiment of the present invention.

FIG. 4 shows a perspective view and a side view illustrating the second fixing clip according to one embodiment of the present invention, and FIG. 5 is a view illustrating the second fixing clip coupled to the wire rack and the slide rail according to one embodiment of the present invention.

Referring to FIGS. 4 and 5, the second fixing clip 400 includes a first flat part 420, a second flat part 430 formed to face the first flat part 420, and a connection part 410 which connects the first flat part 420 and the second flat part 430 and partially covers the horizontal frame 120.

More specifically, the first flat part 420 is in contact with and welded to one surface of the fixed rail 210 or is coupled to the fixed rail 210 by a rivet, bolt, or the like. In addition, a first convex part 421 convexly formed inward is provided in the first flat part 420, and a first guide part 422, which is formed to be inclined outward and guides coupling with the horizontal frame 120, may be formed on a lower end portion of the first flat part 420.

In addition, the second flat part 430 is formed to be spaced a distance from and face the first flat part 420. In addition, a second convex part 431 convexly formed inward is formed on the second flat part 430, and a second guide part 432, which is formed to be inclined outward and guides coupling for the horizontal frame 120, may be provided on a lower end portion of the second flat part 430. In this case, the first convex part 421 and the second convex part 431 are formed to be horizontally coplanar with each other.

At least one of the first convex part 421 and the second convex part 431 may be omitted, and in a case in which both of the first convex part 421 and the second convex part 431 are provided, the first convex part 421 and the second convex part 431 may be formed to face each other, and preferably, the first convex part 421 and the second convex part 431 may be formed to be misaligned with each other.

The second fixing clip 400 is coupled to the horizontal frame 120 in the downward direction from above, and in this case, the first guide part 422 and the second guide part 432 guide the coupling, and the first convex part 421 and the second convex part 431 induce hooking on the horizontal frame 120.

That is, since the first convex part 421 and the second convex part 431 are convexly formed inward, the first convex part 421 and the second convex part 431 serve as a catch jaw when being coupled to the horizontal parts 121a and 121b, and when a predetermined force is applied thereto, the horizontal parts 121a and 121b push the first convex part 421 and the second convex part 431 out, and the second fixing clip 400 is coupled to the horizontal frame 120.

After the second fixing clip 400 is coupled to the horizontal frame 120, downward movement of the second fixing clip 400 is blocked by the connection part 410, upward movement thereof is blocked by the first convex part 421 and the second convex part 431, lateral movement thereof is blocked by the first flat part 420 and the second flat part 430, and thus the second fixing clip 400 can be more firmly fixed to the horizontal frame 120.

Further referring to FIGS. 4 and 5, when a distance D1 is referred to as a distance between the first flat part 420 and the second convex part 431 or a distance between the second flat part 430 and the first convex part 421 and a distance D2 is referred to as a diameter of the horizontal frame, the distance D1 may be formed to be smaller than the distance D2.

Accordingly, when the second fixing clip 400 is coupled to the horizontal frame 120, the first convex part 421 and the second convex part 431 may serve as the catch jaw and serve to prevent separation after the coupling. That is, a coupling feeling of the second fixing clip 400 and the wire rack 100 can be improved, and vertical movement of the second fixing clip 400 can be blocked.

In addition, when a distance H1 is referred to as a distance between the connection part 410 and a central axis of each of the first convex part 421 and the second convex part 431, and a distance H2 is referred to as a distance between an upper end of the upper horizontal part 121a and a lower end of the lower horizontal part 121b, the distance H1 may be greater than the distance H2.

In addition, after the second fixing clip 400 is coupled to the horizontal frame 120, the upper horizontal part 121a may be formed to be pressed against the connection part 410, and the lower horizontal part 121b may be formed to be pressed against the first convex part 421 and the second convex part 431.

Accordingly, since the vertical movement of the second fixing clip 400 is prevented, the second fixing clip 400 can be more firmly fixed to the horizontal frame 120.

Meanwhile, the second fixing clip 400 may further include a lateral support part 440 supported by the vertical frame 110.

More specifically, the lateral support part 440 includes a third bent part 441 formed to be bent outward from the second flat part 430 and a fourth bent part 442 which extends from the third bent part 441 and is bent to be supported by the vertical frame. That is, the second convex part 431 may be provided at one side of the second flat part 430, and the lateral support part 440 may be provided at the other side thereof. In this case, the fourth bent part 442 of the lateral support part 440 is supported by the vertical frame 110, and thus, the lateral movement thereof can be blocked.

Figure 6:
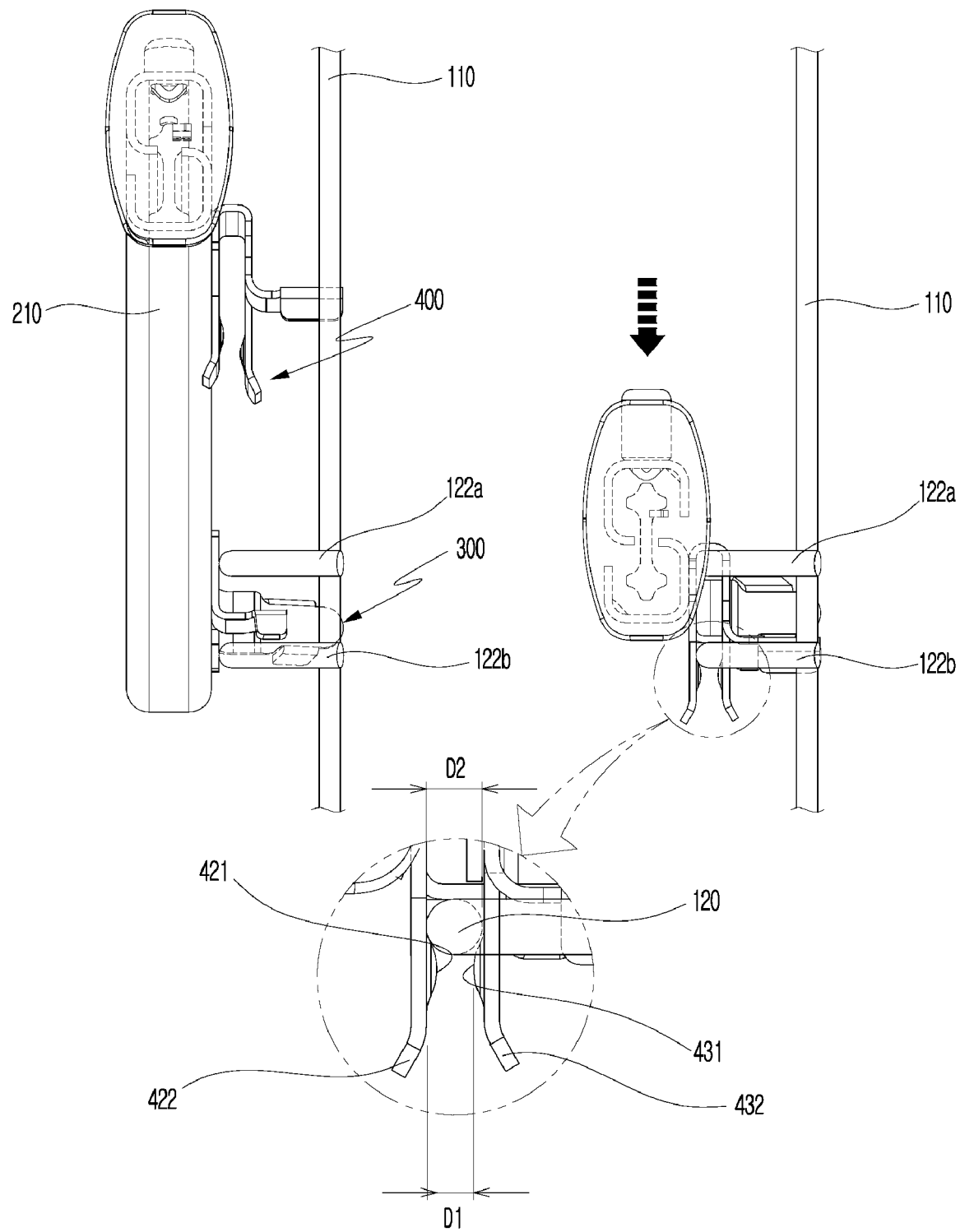
FIG. 6 is a side view illustrating the second fixing clip according to one embodiment of the present invention before and after the second fixing clip is coupled thereto.
Figure 7:
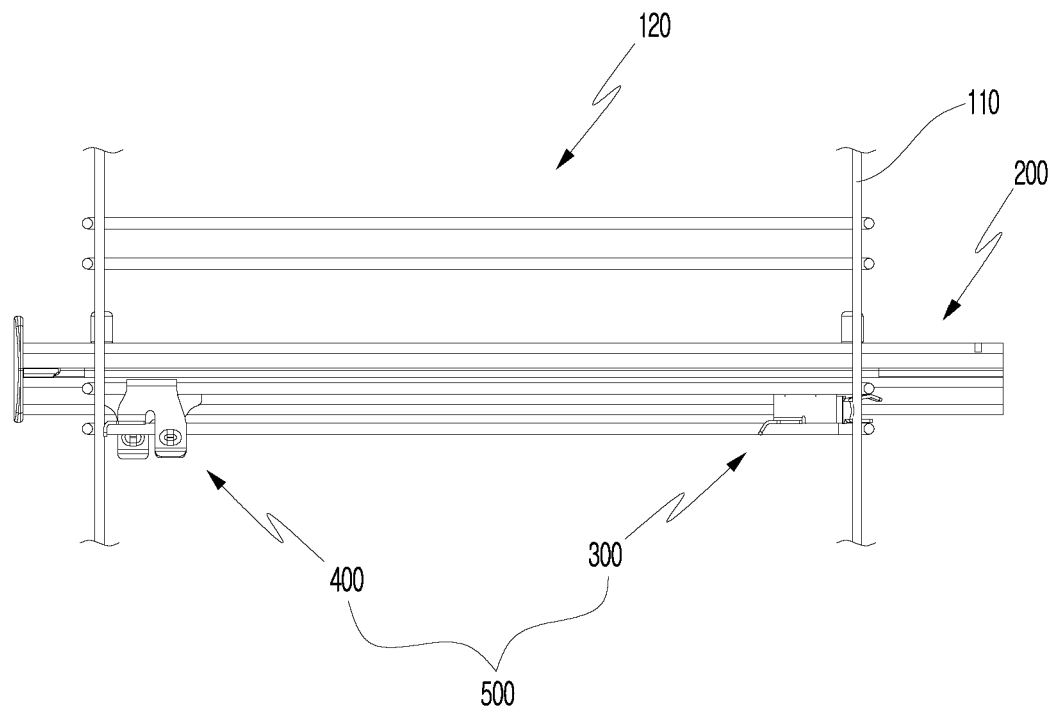
FIG. 7 shows a front view illustrating the fixing assembly according to one embodiment of the present invention and a view illustrating use states according to a coupling process of the fixing assembly.
Figure 7:
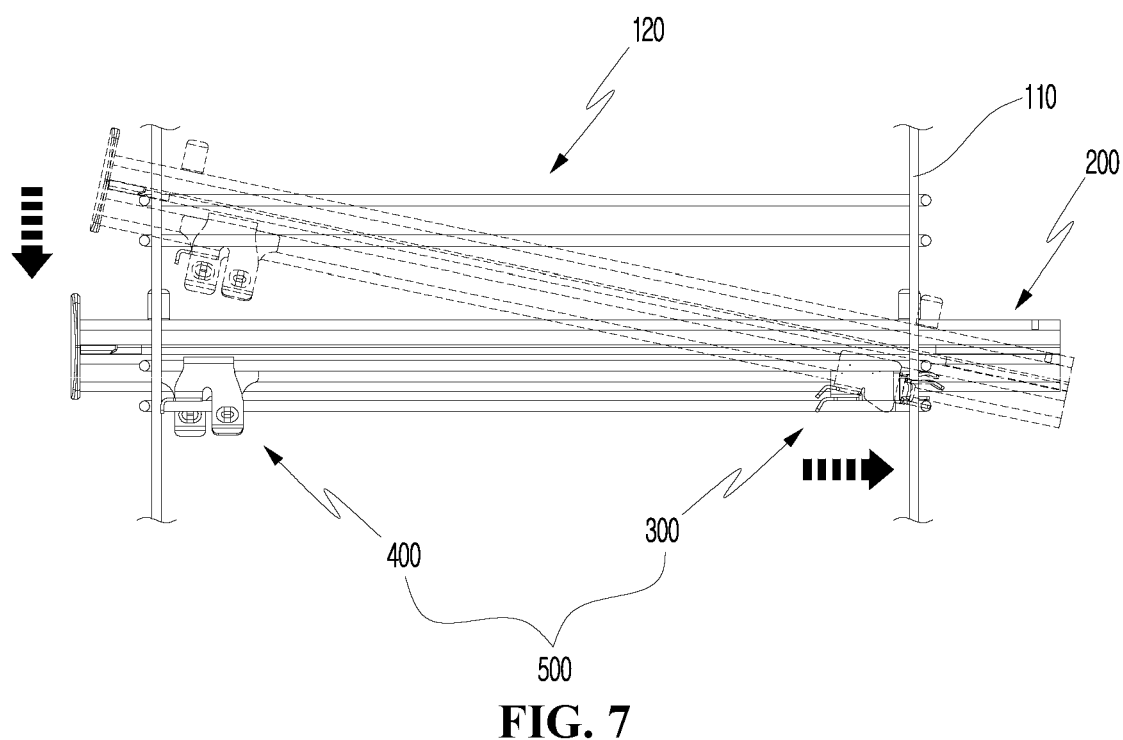

FIG. 6 is a side view illustrating the second fixing clip according to one embodiment of the present invention before and after the second fixing clip is coupled thereto, and FIG. 7 shows a front view illustrating the fixing assembly according to one embodiment of the present invention and a view illustrating use states according to a coupling process of the fixing assembly.

A coupling process of the slide rail 200 and the wire rack 100 using the fixing unit 500 will be described below with reference to FIGS. 6 and 7.

First, the first coupling part 340 and the second coupling part 350 of the first fixing clip 300 attached to one end portion of the fixed rail 210 may be fixedly inserted between the angular end portions 122a and 122b formed on one end portion of the horizontal frame 120, and the second fixing clip 400 attached to the other end portion of the fixed rail 210 may move downward from above about the fixedly inserted first fixing clip 300 and be coupled to the horizontal frame 120.

More specifically, while the second fixing clip 400 moves downward from above about the fixed first fixing clip 300 using the principle of the lever, the horizontal frame 120 passes the first guide part 422 and the second guide part 432 which serve as a guide, and passes the first convex part 421 and the second convex part 431 which serve as the catch jaw so that the second fixing clip 400 may be easily fixedly coupled to the horizontal frame 120.

In addition, after the coupling, only when a predetermined force is applied, the second fixing clip 400 may be separated from the horizontal frame 120 due to the first convex part 421 and the second convex part 431 which serve to prevent separation, and thus, in a general use state in which there is no artificial pressure, the second fixing clip 400 can be firmly and fixedly supported by the horizontal frame 120.

That is, lateral separation of the slide rail 200 can be prevented by the auxiliary support part 331 of the first fixing clip 300 and the fourth bent part 442 of the second fixing clip 400, vertical separation thereof can be prevented by the first and second coupling parts 340 and 350 of the first fixing clip 300, the connection part 410 of the second fixing clip 400, and the first and second convex parts 421 and 431, and horizontal separation thereof can be prevented by the auxiliary plate part 311 and the second bent part 322 of the first fixing clip 300 and the first flat part 420 and the second flat part 430 of the second fixing clip 400, and thus, the slide rail 200 can be firmly and fixedly supported by the wire rack 100.

The above description is only exemplary, and it will be understood by those skilled in the art that the invention may be performed in other concrete forms without changing the technological scope and essential features. Therefore, the above-described embodiments should be considered as only examples in all aspects and not for purposes of limitation. For example, each component described as a single type may be realized in a distributed manner, and similarly, components that are described as being distributed may be realized in a coupled manner.

The scope of the present invention is defined by the appended claims and encompasses all modifications or alterations derived from meanings, the scope and equivalents of the appended claims.

REFERENCE NUMERALS

1000: FIXING ASSEMBLY
100: WIRE RACK
110: VERTICAL FRAME
120: HORIZONTAL FRAME
200: SLIDE RAIL
210: FIXED RAIL
220: MOVABLE RAIL
300: FIRST FIXING CLIP
310: PLATE PART
320: HORIZONTAL FIXING PART
330: LATERAL FIXING PART
340: FIRST COUPLING PART
350: SECOND COUPLING PART

400: SECOND FIXING CLIP
410: CONNECTION PART
420: FIRST FLAT PART
430: SECOND FLAT PART
440: LATERAL SUPPORT PART
500: FIXING UNIT

The invention claimed is:

1. A fixing assembly comprising:
a wire rack including a vertical frame and a horizontal frame;
a slide rail including a fixed rail coupled to the wire rack and a movable rail disposed on the fixed rail to move in a sliding manner; and
a fixing unit which fixes the fixed rail to the wire rack, wherein the fixing unit includes a first fixing clip provided at one side of the fixed rail and a second fixing clip provided at the other side of the fixed rail and has a structure in which the first fixing clip can be laterally fixed to the horizontal frame and then the second fixing clip can be vertically fixed to the horizontal frame,
wherein the first fixing clip includes:
a plate part which is in contact with and coupled to one surface of the fixed rail;
a lateral fixing part formed on the plate part and including a first coupling part and a second coupling part coupled to angular end portions of the horizontal frame; and
a horizontal fixing part formed on the plate part and including a first bent part and a second bent part which are supported by a horizontal part of the horizontal frame, and
wherein the first coupling part and the second coupling part are insertion-coupled through a space between an upper angular end portion and a lower angular end portion.

2. The fixing assembly of claim 1, wherein the plate part includes an auxiliary plate part formed to be supported by the horizontal part of the horizontal frame at a lower end portion of the plate part.

3. The fixing assembly of claim 1, wherein the lateral fixing part includes an auxiliary support part formed to be supported by the vertical frame at an end portion of the lateral fixing part.

4. The fixing assembly of claim 1, wherein:
the angular end portions include an upper angular end portion and a lower angular end portion;
the first coupling part includes a first inclined part formed to be inclined upward and fixedly supported by the upper angular end portion and a second inclined part which is formed to be inclined downward and guides coupling of the first coupling part toward the upper angular end portion; and
a boundary part is formed between the first inclined part and the second inclined part.

5. The fixing assembly of claim 1, wherein the second fixing clip includes:
a first flat part which is in contact with and coupled to the one surface of the fixed rail;
a second flat part formed to face the first flat part; and
a connection part which connects the first flat part and the second flat part and partially covers the horizontal frame.

6. The fixing assembly of claim 5, wherein at least one of the first flat part and the second flat part includes a convex part which is convexly formed inward, induces hooking when coupled to the horizontal frame, and prevents separation after the coupling.

7. The fixing assembly of claim 5, wherein the first flat part and the second flat part include a first guide part and a second guide part, respectively, which guide coupling when coupled to the horizontal frame.

8. The fixing assembly of claim 6, wherein, when a distance D1 is referred to as a distance between the first flat part and the convex part formed in the second flat part or between the second flat part and the convex part formed in the first flat part and a distance D2 is referred to as a diameter of the horizontal frame, the distance D1 is formed to be smaller than the distance D2.

9. The fixing assembly of claim 5, wherein:
the second fixing clip further includes a lateral support part supported by the vertical frame; and
the lateral support part includes a third bent part formed to be bent outward from the second flat part and a fourth bent part which is formed to extend from the third bent part and is bent to be supported by the vertical frame.

10. A fixing assembly, comprising:
a wire rack including a vertical frame and a horizontal frame;
a slide rail including a fixed rail coupled to the wire rack and a movable rail disposed on the fixed rail to move in a sliding manner; and
a fixing unit which fixes the fixed rail to the wire rack, wherein the fixing unit includes a first fixing clip provided at one side of the fixed rail and a second fixing clip provided at the other side of the fixed rail and has a structure in which the first fixing clip can be laterally fixed to the horizontal frame and then the second fixing clip can be vertically fixed to the horizontal frame,
wherein the first fixing clip includes:
a plate part which is in contact with and coupled to one surface of the fixed rail;
a lateral fixing part formed on the plate part and including a first coupling part and a second coupling part coupled to angular end portions of the horizontal frame; and
a horizontal fixing part formed on the plate part and including a first bent part and a second bent part which are supported by a horizontal part of the horizontal frame,
wherein:
the angular end portions include an upper angular end portion and a lower angular end portion;
the first coupling part includes a first inclined part formed to be inclined upward and fixedly supported by the upper angular end portion and a second inclined part which is formed to be inclined downward and guides coupling of the first coupling part toward the upper angular end portion; and a boundary part is formed between the first inclined part and the second inclined part, and
wherein, when a distance L1 is referred to as a distance between the boundary part of the first coupling part and a lower end portion of the second coupling part and a distance L2 is referred to as a shortest distance between the upper angular end portion and the lower angular end portion, the distance L1 is formed to be greater than the distance L2.

11. A fixing assembly comprising:
a wire rack including a vertical frame and a horizontal frame;
a slide rail including a fixed rail coupled to the wire rack and a movable rail disposed on the fixed rail to move in a sliding manner; and
a fixing unit which fixes the fixed rail to the wire rack, wherein the fixing unit includes a first fixing clip provided at one side of the fixed rail and a second fixing clip provided at the other side of the fixed rail and has a structure in which the first fixing clip can be laterally fixed to the horizontal frame and then the second fixing clip can be vertically fixed to the horizontal frame, wherein the second fixing clip includes:

a first flat part which is in contact with and coupled to the one surface of the fixed rail;

a second flat part formed to face the first flat part; and a connection part which connects the first flat part and the second flat part and partially covers the horizontal frame, wherein at least one of the first flat part and the second flat part includes a convex part which is convexly formed inward, induces hooking when coupled to the horizontal frame, and prevents separation after the coupling, and wherein, when a distance H1 is referred to as a distance between a central axis of the convex part and the connection part and a distance H2 is referred to as a distance between an upper end of an upper horizontal part and a lower end of a lower horizontal part, the distance H1 greater than the distance H2.

* * * * *